US012769862B2

(12) United States Patent
Joshi

(10) Patent No.: US 12,769,862 B2
(45) Date of Patent: Oct. 20, 2026

(54) DATA AUTHORIZATION USING CONTROLLED ACCESS TECHNIQUES

(71) Applicant: LPL FINANCIAL, LLC, Boston, MA (US)

(72) Inventor: Bhagyeshkumar Joshi, San Diego, CA (US)

(73) Assignee: LPL FINANCIAL, LLC, Boston, MA (US)

( * ) Notice: Subject to any disclaimer, the term of this patent is extended or adjusted under 35 U.S.C. 154(b) by 160 days.

(21) Appl. No.: 18/910,877

(22) Filed: Oct. 9, 2024

(65) Prior Publication Data

US 2026/0099619 A1 Apr. 9, 2026

(51) Int. Cl.
*G06F 21/62* (2013.01)
*H04L 9/32* (2006.01)

(52) U.S. Cl.
CPC ........ *G06F 21/6218* (2013.01); *H04L 9/3213* (2013.01); *H04L 9/3239* (2013.01); *H04L 9/3268* (2013.01); *H04L 9/3297* (2013.01)

(58) Field of Classification Search
CPC . G06F 21/6218; H04L 9/3213; H04L 9/3239; H04L 9/3268; H04L 9/3297
See application file for complete search history.

(56) References Cited

U.S. PATENT DOCUMENTS

| | | | | |
|---|---|---|---|---|
| 12,462,246 | B1 * | 11/2025 | Witchey | H04L 9/3213 |
| 2005/0114666 | A1 | 5/2005 | Sudia | |
| 2016/0006566 | A1 | 1/2016 | Morgner | |
| 2020/0112442 | A1 | 4/2020 | Wentz | |
| 2020/0127994 | A1 * | 4/2020 | Kukreja | G06F 21/31 |

FOREIGN PATENT DOCUMENTS

| | | | |
|---|---|---|---|
| CN | 115883070 | A | 3/2023 |
| CN | 118694521 | A | 9/2024 |
| EP | 3748521 | A1 | 12/2020 |
| WO | WO-2017042400 | A1 | 3/2017 |
| WO | WO-2026080641 | A1 | 4/2026 |

OTHER PUBLICATIONS

International Search Report and Written Opinion, mailed Mar. 27, 2026, International Patent Application No. PCT/US2025/050120, filed on Oct. 8, 2025.

* cited by examiner

*Primary Examiner* — Huan V Doan
(74) *Attorney, Agent, or Firm* — Mintz Levin Cohn Ferris Glovsky and Popeo, P.C.

(57) ABSTRACT

Data characterizing a request to access a database record, a data attribute of the database record, and an authorization token are received. Based on the received data, permission to access the database record is determined by at least validating the authorization token using the data attribute. The authorization token can be generated by producing hash values for the database record and generating a bit array for the hash values. Related apparatus, systems, techniques, and articles are also described.

17 Claims, 7 Drawing Sheets

600

A. Creation 605 1. Get the count of total data attribute. Based on that prepare bit array of that size that can fit all of them. Factor that with tolerance percentage. Below is the Formula:

Bitmap Size = (int)Math.Ceiling(-capacity * Math.Log(falsePositiveRate) / Math.Pow(Math.Log(2), 2));

Also, derive number of iterations(numHashFunctions) to factor the hash values into integer based on capacity.

610 numHashFunctions = (int)Math.Ceiling((bitArraySize / (double)capacity) * Math.Log(2))

This value will be preserved and shipped with the authorization token. It is required for validation as well to apply same number of iteration to hash target value and match it gainst Bitmap 615 Test Data:
Input: Capacity: 1, FalsePositiveRate: 0.001, numHashFunctions: 11
Output: Bitmap of size 15 {bitArray[15]}

620 2. Create hash of each data attribute. (C# code snip)

```
using (SHA256 sha256 = SHA256.Create())
{
    byte[] inputBytes = Encoding.UTF8.GetBytes(input);
    byte[] hashBytes = sha256.ComputeHash(inputBytes);
}
```

625 3. Convert hash values into array of integer. 4 bytes * 1 integer for the number of iterations defined based on data size.

```
for (int i = 0; i < numHashFunctions; i++)
{
    if ((i * 4) + 4 > hashBytes.Length) break;
    // int hashValue = BitConverter.ToInt32(hashBytes, i * 4) % bitArray.Length;
    int hashValue = int.Parse(Convert.ToHexString(hashBytes.AsEnumerable<byte>().Skip(i*4).Take(4).ToArray<byte>()),
System.Globalization.NumberStyles.HexNumber)% bitArray.Length;
    yield return Math.Abs(hashValue);
}
```

630 4. In the bitmap, place value 'true' at the location that integer number points bitArray[hashValue] = true;

635 5. Create base46 of the Bitmap, concatenate numHashFunctions with base64 of Bitmap separated by keyword 'Bh@gy3sh'.

Sample: 11Bh@gy3shAfo=

640 6. (Optional) Sign the token with certificate and preserve signature.

FIG. 6

DATA AUTHORIZATION USING CONTROLLED ACCESS TECHNIQUES

TECHNICAL FIELD

The subject matter described herein relates to data authorization using controlled access techniques.

BACKGROUND

Data authorization includes a process for determining access to various data resources. It can involve defining access policies based on permissions and attributes to regulate access to data, ensuring authorized entities are granted access. When an entity requests access to a data resource, their credentials can be checked against these access policies to determine whether access can be granted.

Data authorization platforms often require complex and resource-intensive configurations to manage access control. Moreover, methods frequently rely on accessing dedicated servers through application programming interfaces (APIs), which can create bottlenecks and long latencies in high traffic environments. Further, data authorization can become unwieldly when dealing with multi-domain systems or distributed architectures with data stored across multiple locations. Accordingly, data authorization has become increasing challenging to implement across diverse systems and networking environments.

SUMMARY

In an aspect, data is received characterizing a request to access a database record, a data attribute of the database record, and an authorization token. Based on the received data, permission to access the database record is determined by at least validating the authorization token using the data attribute. Access to the database record is provided in response to determining permission to the database record.

One or more of the following features can be included in any feasible combination. For example, the data attribute can indicate an owner of the database record and include at least one identifier indicating a user identity having permission to access the database record. The authorization token can be generated by determining a size of a bit array corresponding to the database record based on contextual information associated with the database record; determining a number of iterations for a hash function based on the size of the bit array and the contextual information associated with the database record; generating the bit array based on the size of the bit array, number of iterations for the hash function, and the contextual information associated with the database record; generating a hash value by applying a cryptographic function based on the size of the bit array and the number of iterations; plotting the hash value in the bit array based on the cryptographic function; and encoding the bit array into a format capable of transmission. The generation of the authorization token can include adding a timestamp to the authorization token. The generation of the authorization token can include signing the authorization token with a certificate.

The authorization token can be validated by splitting the authorization token into a first value including an encoded bit array and a second value indicative of a hash function; decoding the encoded bit array into a decoded bitmap; generating a hash value from authorization information associated with the data attribute; converting the hash value into an array of integers based on at least the second value; comparing the array of integers and the decoded bitmap; and determining permission to access the database record in response to the array of integers matching the decoded bitmap. The validation of the authorization token can include verifying a signature provided with the authorization token with a public certificate.

The data characterizing a request to access a database record, a data attribute of the database record, and an authorization token can be received by an application programming interface. Providing access to the database record can include transmitting a query request for data to the database record and returning the requested data from the database record when the query request is received by the database record.

Non-transitory computer program products (i.e., physically embodied computer program products) are also described that store instructions, which when executed by one or more data processors of one or more computing systems, causes at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 is an example method of generating the authorization token.

Like reference symbols in the various drawings indicate like elements.

DETAILED DESCRIPTION

When an entity requests access to a data resource, their credentials are checked against database records to determine whether access can be granted. Traditionally, this request accesses a domain network through an application programming interface (API), which checks the entity's permissions against predefined access rules and filters the database records accordingly. While this approach may work in simple, single-domain networks, these methods are computationally complex in multi-domain designs where database records are spread across different domains. For example, managing database records across multiple APIs and systems requires coordinating permissions across multiple domains, which can be computationally expensive and require API calls across the multiple domains for each data record. In addition, some records can be inaccessible to other domains.

Accordingly, some implementations of the current subject matter include an approach to determining access to database records that includes validating an authorization token using a data attribute. Access to the database records can be provided when permission has been granted. By validating an authorization token, which contains a collection of access permissions, the authorization token can be validated across multiple domains without making time and computational-intensive API calls across multiple domains and systems. Further, in some implementations, the authorization token can encapsulate access rights in a single, easily transferable package that can be quickly validated against the database record with limited computational overhead.

In addition, some implementations of the subject matter can include generating the authorization token by generating hash values based on access information and generating a bit array for the hash values. In some implementations, this results in an authorization token that can be resistant to tampering or forgery, ensuring the token can be securely validated without necessitating continuous reference to the original authorization source.

Figure 1:
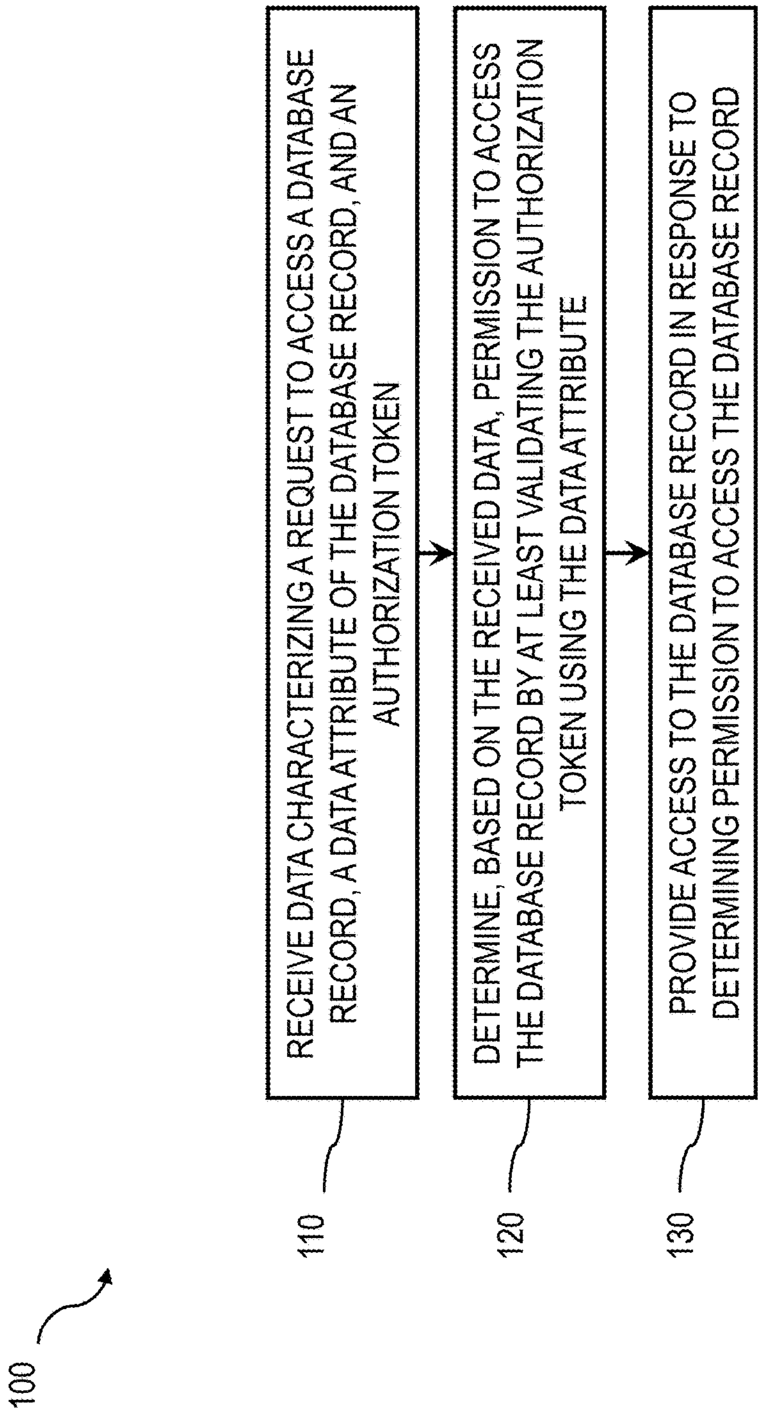
FIG. 1 is a process flow diagram illustrating an example process of determining access to a database record that includes validating an authorization token using a data attribute.

FIG. 1 is a process flow diagram illustrating an example method 100 of determining access to a database record by validating an authorization token using the data attribute which can enable data access with limited computational overhead.

At 110, data can be received characterizing a request to access a database record, a data attribute of the database record, and an authorization token. The request can originate from a user device, an entity, another network domain, or from other sources. The data attribute can include an access control list (ACL), metadata, cryptographic signatures, or other access policies and permissions. The data attribute can be used to determine whether access can be granted to the data record. For example, in some implementations, the data attribute can indicate an owner of the database record and include at least one identifier indicating a user identity having permission to access the database record. The identifier can include a hash value or a bitmap to indicate ownership of the data record and user identities having permission to access the databased record. The identifier can also be subject to frequent updates as permission to access the database record are updated accordingly. The user identity can refer to an individual network user, a group of network users, an inquiring software service, a collective of entities, or any other configurations used in networking environments. In some implementations, the data attribute can reside as metadata stored with the associated data record.

In some implementations, the data attribute can be linked to login credentials and the identifier signifies consent from other users to access their data records. For example, a supervisor can have access information that includes identifiers (e.g., data values) for their subordinates, indicating permission to access the subordinate's data records. Some implementations of the data attribute can be useful for various scenarios, such as licensing, joint ventures, profit-sharing, and accessing supervisor or peer data. Other implementations of the data attribute can be useful in domain-driven designs (DDD), where permission information can be spread across different domains and can be inaccessible to one another.

The data record can represent information stored in a record or a storage device. In some implementations, the data record can include fields, such as identifiers, metadata, and/or attributes that describe or contextualize the data. For example, the data record can include information relating to a subordinate's work, including their task assignments, project status, performance metrics, relevant deadlines, and the like. Depending on the domain, the data record can also contain sensitive information, such as financial details, medical history, or access permissions. Additionally, the data records can include references or pointers to related data records on the same domain or in different domains. In some implementations, a domain can include one or more logically or physically separated databases or data sets.

The authorization token can include a digital credential that encapsulates access information within a transferable package. The authorization token can serve as a digital credential that includes a collection of access permissions. In some implementations, the authorization can include an encapsulated bitmap of hash values corresponding to different data records that access has been granted to. Further, the authorization token can serve as a single transferable package that can be quickly validated against multiple database records with limited computational overhead. The authorization token can be encoded for compact transportation.

At 120, permission to access the database record can be determined based on the received data by at least validating the authorization token using the data attribute. According to some implementations, the authorization token can be decoded to extract permission information. In some implementations, the permission information can include a bitmap indicative of access to different data records.

In some implementations, the extracted permission information can be evaluated to determine whether access is provided to the database record. For example, the permission information can be compared to information associated with the data attribute for the data record. In some implementations, the information associated with the data attribute can include authorization data, including an identifier indicating a user identity having permission to access the database record or a list of credentials required to access the database record. If the extracted permission information matches with the information associated with the data attribute, access can be provided. If the extracted permission and access match do not match with the information associated with the data attribute, access can be denied. In some implementations, the information associated with the data attribute for the data record can be converted into hash values. In some implementations, the match can include checking if all the hash values indicative of access to different data records correspond to entries in the identifier of the data attribute.

At 130, access is provided to the database record in response to determining permission to access the database record. In some implementations, access is granted to the database record. In some implementations, a flag, permission, or token granting access can be provided, allowing the database record to be retrieved later or granting access to an alternate service or network. In some implementations, a portion of the data record can be returned, such as specific fields or attributes depending on the request to access. In some implementations, limited information about the data record can be provided, such as its existence or location, depending on the credentials. In some implementations, a reference or a pointer to the database record location is provided rather than transmitting the data itself. If access to the database record is denied, the response can indicate insufficient permissions or provide additional details to obtain the necessary permissions.

Figure 2:
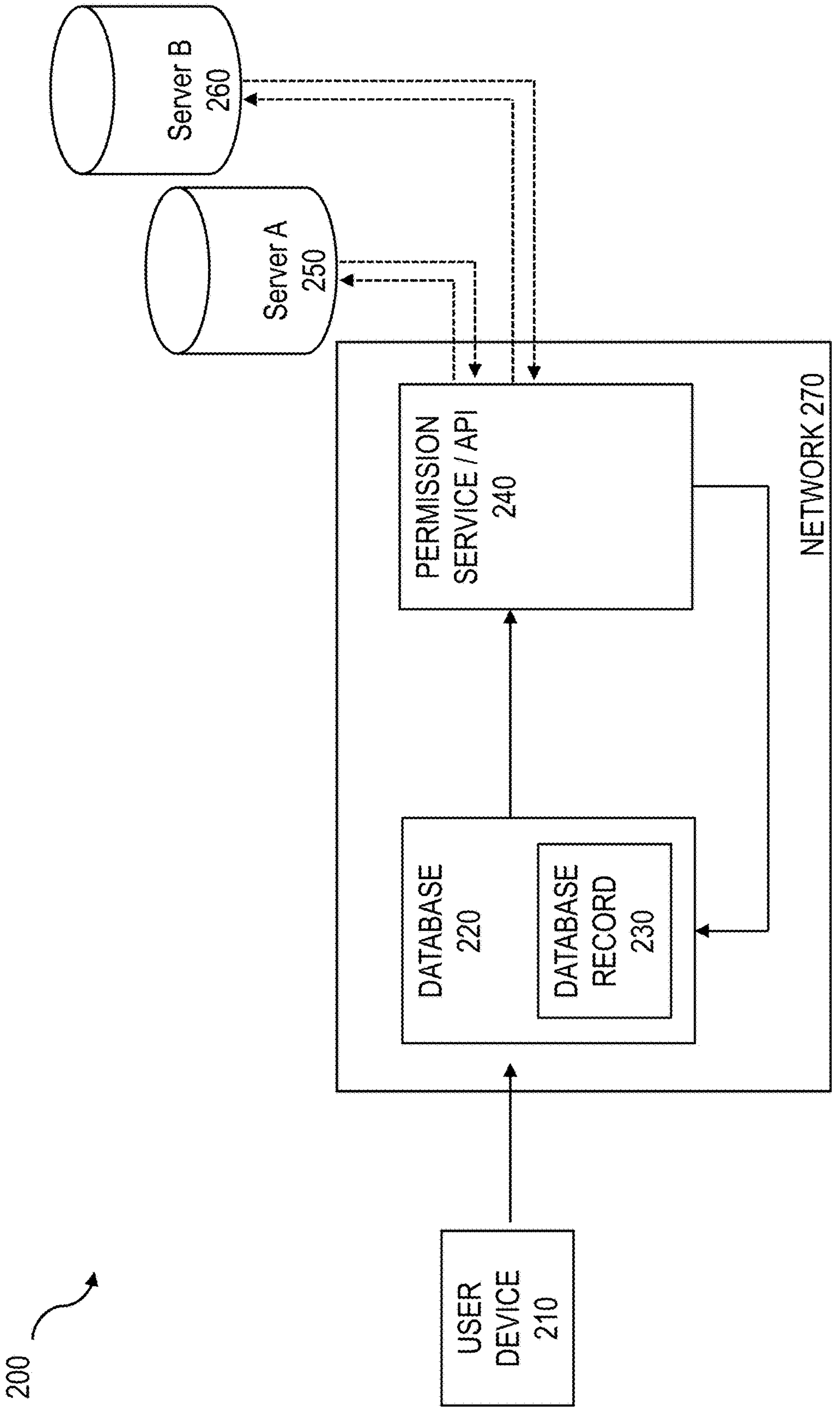
FIG. 2 is a system diagram illustrating an example system that determines access to a database record that includes validating an authorization token using a data attribute.

FIG. 2 is a system diagram illustrating an example system 200 that determines access to a database record by validating an authorization token using the data attribute which can enable data access with limited computational overhead. The system 200 can include user device 210, network 270, and servers (server A 250 and server B 260). The network 270 can include permission service 240 and a database 220 storing a database record 230.

A user device 210 can send data characterizing a request to access a database record, a data attribute of the database record, and an authorization token to network 270. The user device 210 can include a mobile phone or computing device incorporating applications or services requesting access to the database record. The user device 210 can include a server or a network node requesting access on behalf of internal or shared services. The user device 210 can also be an automated system capable of performing recurring or event-driven database record requests. The user device 210 can also include a software service or application running on a platform designed to send requests to access database records. The user device 210 can also include other devices found in computerized or networking environments.

The network 270 can receive the data characterizing a request to access a database record, a data attribute of the database record, and an authorization token from the user device 210. Network 270 can include a local area network (LAN), wide area network (WAN), cloud-based virtualized environment, or other networking configurations. Network 270 includes a database 220 and a permission service 240.

The database 220 can provide secure storage, retrieval, and management of the database record. The database 220 can further include the database record 230. In some implementations, the database 220 includes a single centralized server and provides access directly to the database. In some implementations, the database 220 is distributed across multiple servers in different domains.

The permission service 240 can include an API or networking application. In some implementations, the permission service 240 is capable of receiving and validating an authorization token using the data attribute and providing access to the database records when permission has been granted. For example, the permission service 240 can decode the authorization token and extract permission information, which is evaluated to determine whether access is provided. In some implementations, the permission information can include hash values indicative of access to different data records.

In some implementations, the permission service 240 can evaluate the extracted permission information to determine whether access is provided to the database record. For example, the permission service 240 can compare the extracted permission information to information associated with the data attribute for the data record. In some implementations, the information associated with the data attribute can include authorization data, including an identifier indicating a user identity having permission to access the database record or a list of credentials required to access the database record. In some implementations, the permission service 240 can check if the hash values indicative of access to different data records correspond to entries in the identifier of the data attribute. If the extracted permission information matches with the information associated with the data attribute, the permission service 240 can provide access to the database record 230. If the extracted permission and access match do not match with the information associated with the data attribute, the permission service 240 can deny access to the database record 230.

In some implementations, once the permission service has determined whether access can be provided, the permission service 240 can notify database 220 to provide the user device 210 with access to the database record 230. In some implementations, permission service 240 can provide a flag, permission, or token to the database 220, granting the user device 210 access to the database record 230. In some implementations, the permission service 240 can provide a reference or a pointer to the location of the database record. In some implementations, the permission service 240 can provide access or a pointer to the database record stored in an external server A 250. In one implementation, the permission service 240 can provide access or pointers to the database record stored in multiple servers, e.g., server A 250 and server B 260. In some implementations, if access is denied, the permission service 240 can generate a response to the user device 210 to prevent access to the database record 230, indicate insufficient permissions, or provide additional details on obtaining the necessary permissions.

Figure 3:
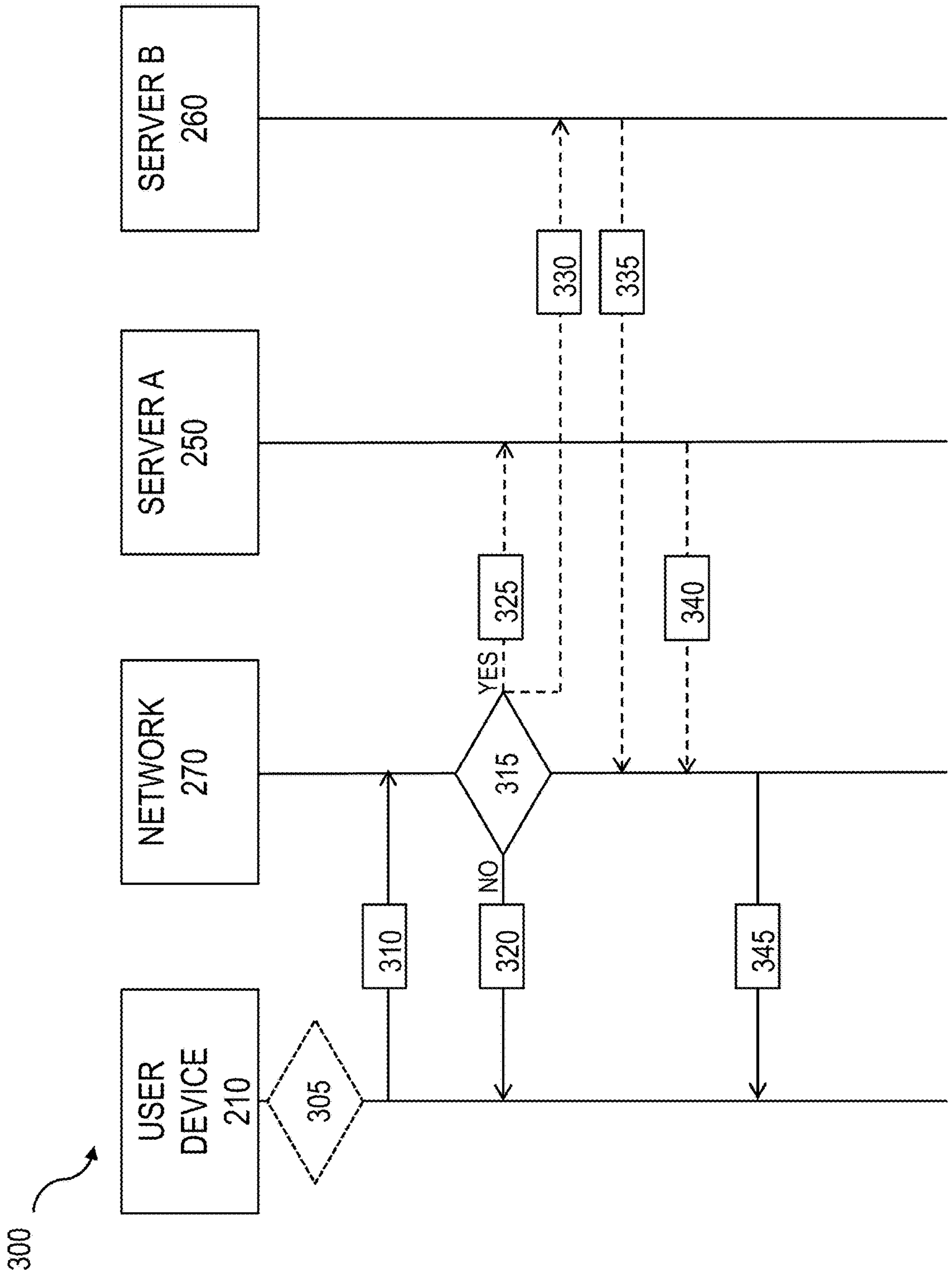
FIG. 3 is a data flow diagram illustrating an example data communication flow for determining access to a database record that includes validating an authorization token using a data attribute.

FIG. 3 is a data flow diagram illustrating example data communication flows between components of the system 200 illustrated in FIG. 2. At 305, the authorization token can be generated. In some implementations, the authorization token is generated by the user device 210. In some implementations, the authorization token can be generated by network 270, a software service or application running on a platform, or other devices used in networking environments.

Figure 4:
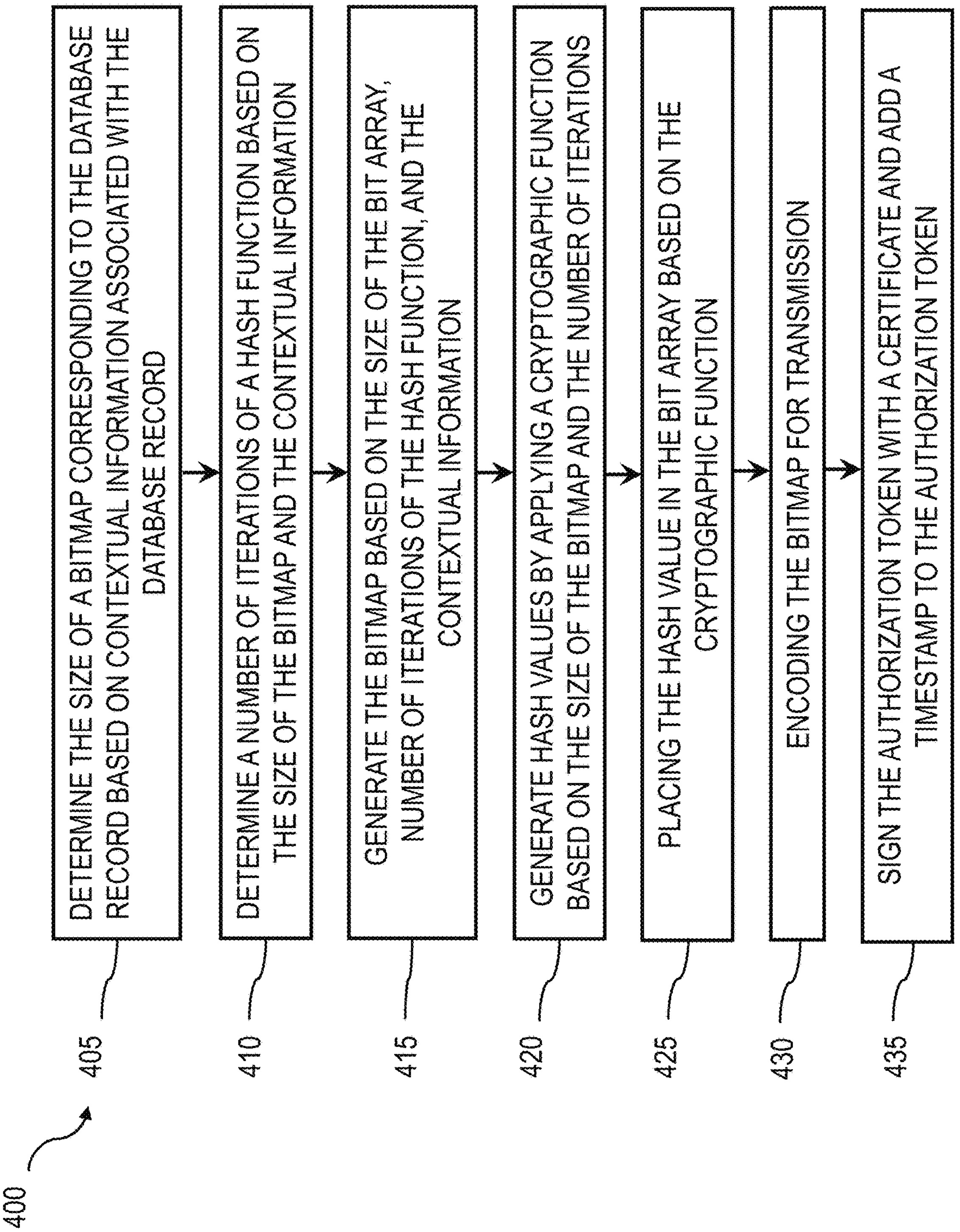
FIG. 4 is a process flow diagram illustrating an example method of generating the authorization token.

One example illustrating the generation of the authorization token 305 is shown in FIG. 4. FIG. 4 is a process flow diagram illustrating an example method 400 for generating the authorization token for validating the database record. For example, method 400 can include generating the authorization token by applying a cryptographic function to information associated with the database record.

At 405, the size of a bitmap corresponding to the database record can be determined based on contextual information associated with the database record. In some implementations, the contextual information can include information such as the count of the data attribute, the capacity of the database record, and a false positive rate. The false positive rate can correspond to the tolerance of failure for the authorization token. In some implementations, the false positive rate can be determined by a user device, an entity, another network domain, or from other sources. In some implementations, the false positive rate can be variably set depending on requirements of the database record. In some implementations, the contextual information can include information specific to the user identity having permission to access the database record, including data values indicating access to database records.

At 410, a number of iterations for a hash function is determined based on the size of the bitmap and the contextual information associated with the database record. In some implementations, the false positive rate can increase or decrease the number of iterations of a hash function to improve the accuracy and performance of validating the authorization token.

At 415, the bitmap is generated based on the size of the bitmap, number of iterations for the hash function, and the contextual information associated with the database record. At 420, the hash value is generated by applying a cryptographic function based on the size of the bit array and the number of iterations of the hash function. In some implementations, the hash value is generated by using UTF-8 encoding to generate a series of bytes, which are further hashed using a secure hash algorithm (e.g., SHA-256) to generate the hash value. Further, the cryptographic function can include converting the hash value into an array of integers corresponding to the bitmap.

At 425, the hash values are plotted into the bit array based on the cryptographic function. In some implementations, an indicator or a flag can be placed in the bitmap corresponding to the hash value.

At 430, the bitmap is encoded into a format capable of transmission. In some implementations, the bitmap can be encoded in base64 and concatenated with the number of iterations for the hash function.

At 435, the bitmap can be signed with a certificate and added with a timestamp to verify any in-flight tampering with the authorization token. In some implementations, the bitmap can be digitally signed by a secure sockets layer (SSL) certificate.

Returning to FIG. 3, at 310, the user device 210 sends data characterizing a request to access a database record, a data attribute of the database record, and an authorization token to network 270. At 315, network 270 determines permission to access the database record by at least validating the authorization token using the data attribute. In some implementations the validation can be completed by the permission service 240. In some implementations, the validation can be completed by the database 220, an API, or by the user device 210.

Figure 5:
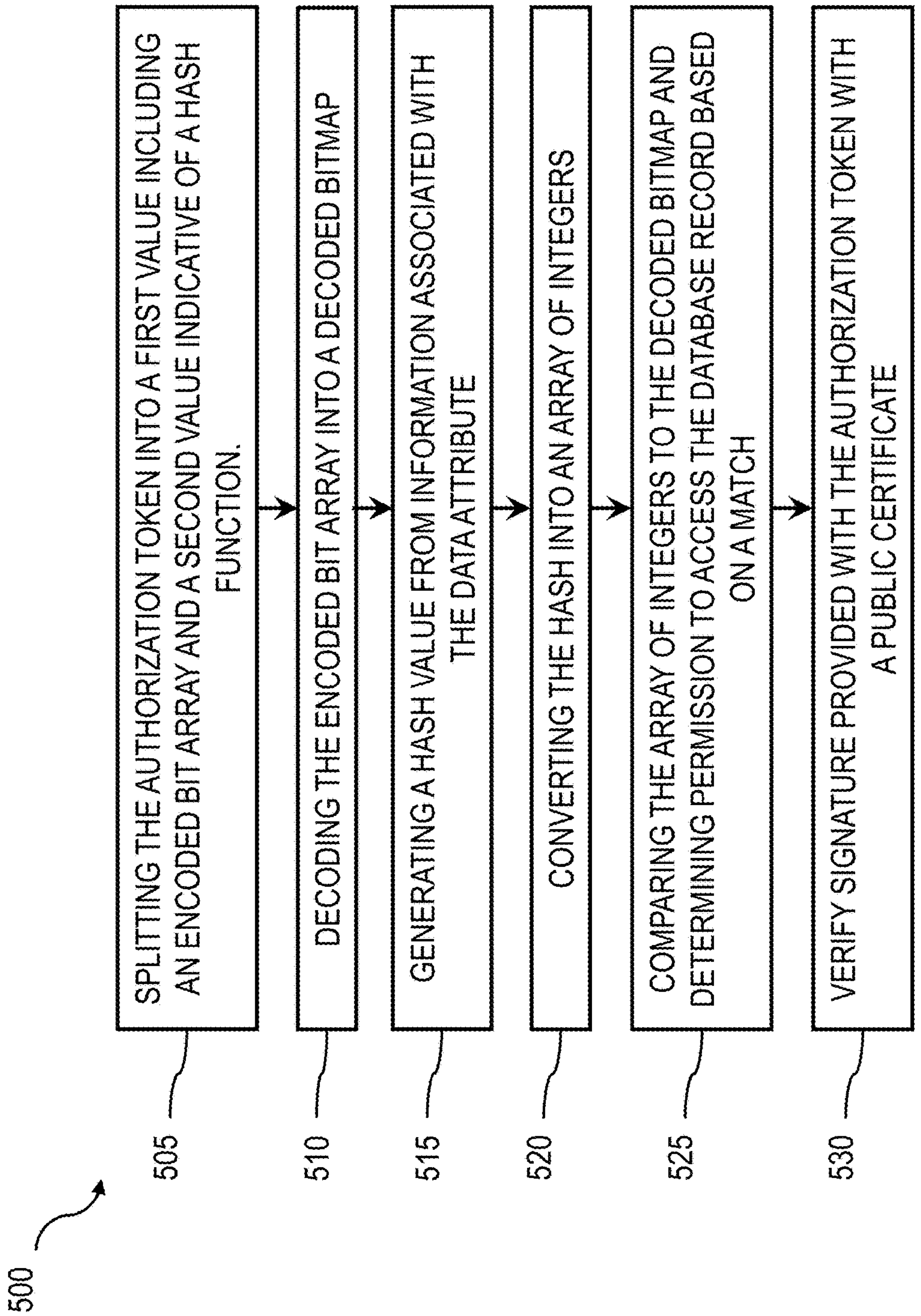
FIG. 5 is a process flow diagram illustrating an example method of validating the authorization token using a data attribute.

One example illustrating the validation of the authorization token is shown in FIG. 5. FIG. 5 is a process flow diagram illustrating a method 500 for validating the authorization token using a data attribute.

At 505, the authorization token is split into a first value including an encoded bit array and a second value indicative of a hash function. In some implementations, the encoded bit array is encoded in base64 encoding. In some implementations, the second value indicative of a hash function includes a number of iterations for a hash function.

At 510, the encoded bit array is decoded into a decoded bitmap. In some implementations, the encoded bit array is decoded using base64 decoding.

At 515, a byte value is generated from authorization information associated with the data attribute. In some implementations, the byte value is generated by using UTF-8 encoding to generate a series of bytes, which are further hashed using a secure hash algorithm (e.g., SHA-256) to generate a hash value. In some implementations, a bit filter is used to generate the hash value.

At 520, the hash value is converted into an array of integers based on at least the second value indicative of a hash function. In some implementations, the hash value is converted into an array of integers based on the number of iterations for the hash function and a length of the decoded bit array.

At 525, the array of integers is compared to the decoded bitmap. In some implementations, the decoded bitmap can include an array and the array of integers can represent locations in the decoded bitmap array. If the values in the decoded bitmap at the locations corresponding to the array of integers match (e.g. contain valid information or true), the token can be validated and permission can be granted to access the database record.

At 530, the signature provided with the authorization token can be verified with a public certificate. In some implementations, the signature is verified with a public SSL certificate to ensure no tampering of the authorization token, Returning to FIG. 3, if the validation is unsuccessful, network 270 can return permission denied 320 to the user device 210. This can include, for example, a response indicating insufficient permissions or a request to obtaining the necessary permissions.

If the validation is successful, network 270 can return access to the database record 345 to the user device 210. In some implementations, network 270 can provide access directly to the database record. In some implementations, network 270 can provide requested data from the database record. In some implementations, network 270 can provide a flag, permission, or token to the user device 210, allowing the database record to be retrieved later or access to an alternate service or network. In some implementations, network 270 can provide a portion of the data record, such as specific fields or attributes. In some implementations, network 270 can provide limited information about the data record, such as its existence or location, depending on the credentials. In some implementations, network 270 can provide a reference or a pointer to the database record location.

In some implementations, if the validation is successful, network 270 can request the database record from server A 250. Network 270 can provide a request for the database record 325 to server A. If server A contains the database record, server A can retrieve the relevant data and provide a request response 340. The request response 340 can include the database record or information pertaining to the database record. In some implementations, the request response 340 can include a reference or a pointer to the location of the database record. In some implementations, network 270 can request the database record from server B 260. In some implementations, network 270 can request the database record from server A 250 and server B 260, or other servers not shown in FIG. 3 depending on the configuration.

FIG. 6 illustrates an example implementation of 305. For example, at 605, the size of the bitmap is determined based on a count of the data attribute and a false positive rate.

At 610, a number of iterations for a hash function is determined based on the size of the bitmap and the count of the total data attribute. In some implementations, the number of iterations for a hash function is preserved and shipped with the authorization token.

At 615, the bitmap (e.g. bitArray) is generated based on the size of the bitmap, the tolerance percentage, and the number of iterations for a hash function.

At 620, the hash values are generated by applying UTF-8 encoding to generate a series of bytes, which are hashed using secure hash algorithm 256 (SHA-256) to generate the hash values.

At 625, the hash values are converted into an array of integers using a cryptographic function. The integer can include four bytes to represent the hash value.

At 630, the hash values are plotted in the bitmap based on the cryptographic function. An indicator (e.g., "true") or a value can be placed in the bitmap corresponding to the hash value.

At 635, the bitmap is encoded in base64, concatenated with the number of iterations for a hash function and separated by a keyword.

At 640, in some implementations the bitmap can be signed with a certificate.

Figure 7:
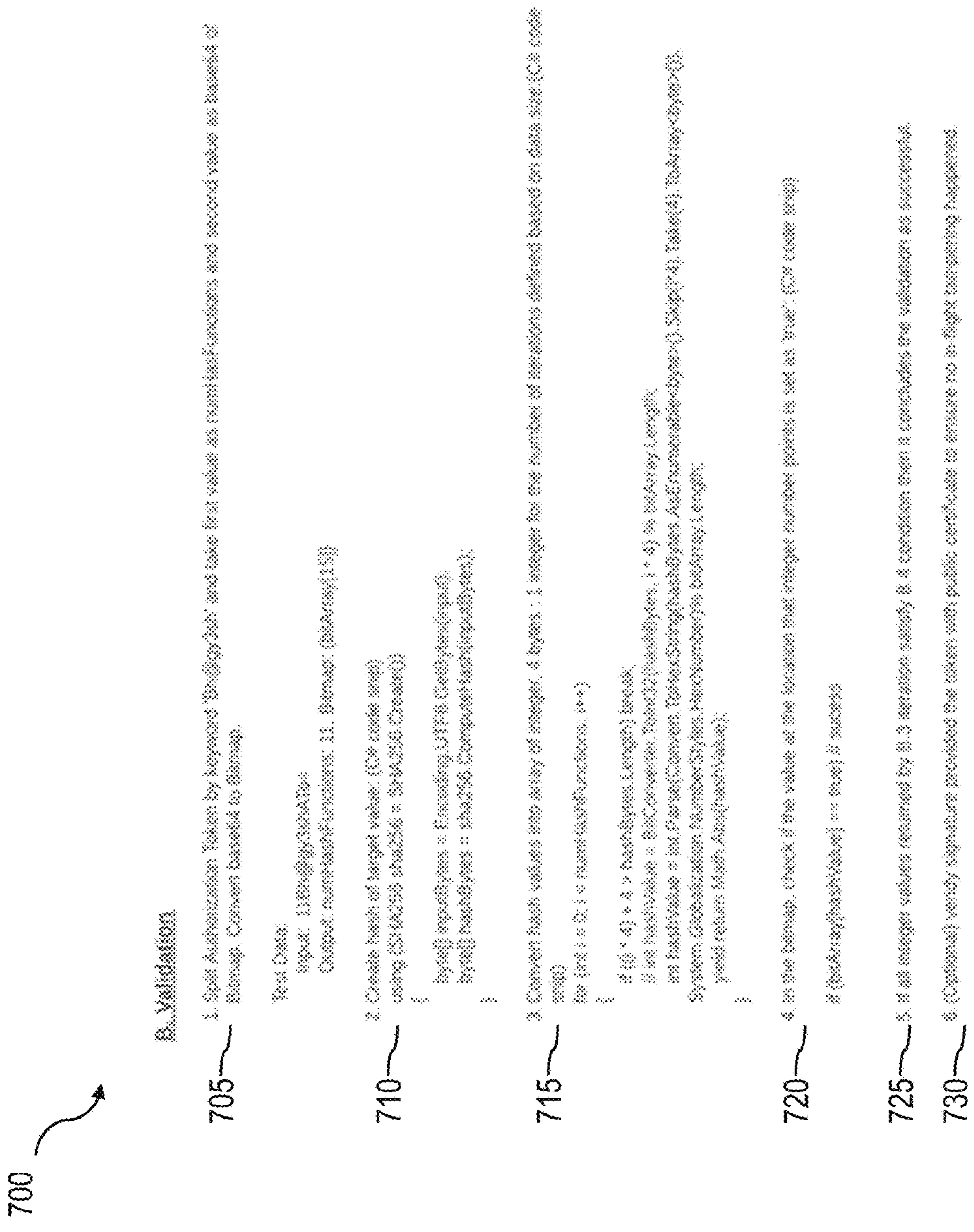
FIG. 7 is an example method of validating the authorization token.

FIG. 7 illustrates an example implementation of 315. For example, at 705, the authorization token is split into a first value indicative of a number of iterations for a hash function and a second value including a bitmap encoded in base64. The bit array is decoded into a decoded bitmap.

At 710, a byte value is generated from an input including authorization information associated with the data attribute. The byte value is generated by using UTF-8 encoding to generate a series of bytes, which are further hashed using secure hash algorithm 256 (SHA-256) to generate a hash value.

At 715, the hash value is converted into an array of integers using a cryptographic function. The integer can include four bytes to represent the hash value.

At 720, the bitmap at the hash value is compared to the location of the array of integers corresponding to the authorization token. If the hash value corresponding to the data attribute location matches with the location of the array of integers corresponding to the authorization token, the token can be validated.

At 730, a signature provided with the authorization token can be verified with a public certificate.

The following SQL code is an example implementation of 510 and 525.

```
CREATE OR REPLACE FUNCTION public.contains__rep(
    input__text text, auth__token text)
  RETURNS boolean
  LANGUAGE 'plpgsql'
  COST 100
  VOLATILE PARALLEL UNSAFE
AS $BODY$
DECLARE
  hash__value integer;
    num__hash__functions integer DEFAULT 7;
    bit__array__length integer;
    bytes bytea;
    args text[ ];
BEGIN
    args :=string__to__array(auth__token,'Bh@gy3sh');
    RAISE NOTICE 'auth token: %',(args) [2];
    bytes := decode((args) [2], 'base64');
    num__hash__functions := (args) [1]::integer;
    bit__array__length := length(bytes)*8;
    RAISE NOTICE 'bytes: %',bytes;
  FOR hash__value IN SELECT * FROM
get__hash__values(upper(input__text),num__hash__functions, bit__ar
ray__length) LOOP
      IF get__bit(bytes,hash__value) != 1 THEN
            RAISE NOTICE 'hash__value: %',hash__value;
            RAISE NOTICE 'bit__value:
%',get__bit(bytes,hash__value);
          RETURN false;
            EXIT;
        END IF;
  END LOOP;
  RETURN TRUE;
END;
$BODY$;
ALTER FUNCTION public.contains__rep(text,text)
  OWNER TO lplpgadmin;
```

The following SQL code is an example implementation of 515 and 520.

```
CREATE EXTENSION IF NOT EXISTS pgcrypto;
CREATE OR REPLACE FUNCTION public.get__hash__values(
    input__text text,num__hash__functions
integer,bit__array__length integer)
  RETURNS SETOF integer
  LANGUAGE 'plpgsql'
  COST 100
  VOLATILE PARALLEL UNSAFE
  ROWS 1000
AS $BODY$
DECLARE
  i integer;
  hash__bytes bytea;
    hash__bytes__str text;
  hash__value integer;
BEGIN
  hash__bytes := digest(input__text, 'sha256');
    hash__bytes__str := encode(hash__bytes, 'hex');
    RAISE NOTICE 'Element: %', encode(hash__bytes, 'hex');
  FOR i IN 0..(num__hash__functions - 1) LOOP
        if ((i*8) +9 > Length(hash__bytes__str)) THEN
          EXIT;
        end if;
      hash__value := ((('x' | |
lpad(substring(hash__bytes__str,(i*8) +1,8), 8,
'0'))::bit(32)::int)
              % bit__array__length) ;
      RETURN NEXT ABS(hash__value);
  END LOOP;
  RETURN;
END;
$BODY$;
ALTER FUNCTION public.get__hash__values(text,integer,integer)
  OWNER TO lplpgadmin;
```

The following C#code is an example implementation of 110.

```
  using System;
  using System.Collections;
  using System.Collections.Generic;
  using System.Linq;
  using System.Text;
  using System.Threading.Tasks;
  using Npgsql;
  namespace Authorizer
  {
    internal class PGSql
    {
      public static string Execute(BitArray bitArray,
  string test__string)
        {
          String connectionString = "*****";
          var connection = new
  NpgsqlConnection(connectionString);
          connection.Notice += (sender, args) =>
          {
            Console.WriteLine($"PostgreSQL Message:
  {args.Notice.MessageText}");
          };
          connection.Open( );
          var query = "SELECT contains__Bit('" +
  test__string+"', @bitArrayParam) as result";
          using var command = new NpgsqlCommand(query,
  connection);
          var intArray = new int[bitArray.Length];
          for (int i = 0; i < bitArray.Length; i++)
          {
            if (bitArray[i]) intArray[i] = 1; else
  intArray[i] = 0;
          }
          var bitArrayParam = new
  NpgsqlParameter("@bitArrayParam",
  NpgsqlTypes.NpgsqlDbType.Integer |
  NpgsqlTypes.NpgsqlDbType.Array)
          {
            Value = intArray // Example bit array
          };
```

-continued

```
            command.Parameters.Add(bitArrayParam);
            var result = string.Empty;
            try
            {
               var reader = command.ExecuteReader( );
               while (reader.Read( ))
               {
                  result = reader ["result"].ToString( );
                  break;
               }
            }
            catch (Exception ex)
            {
               Console.WriteLine($"Error: {ex.Message}");
            }
            finally
            {
               connection.Close( );
            }
            return result;
         }
         public static string Execute(String auth_token,
   string test_string)
         {
            String connectionString = "*****";
            var connection = new
   NpgsqlConnection(connectionString);
            connection.Notice += (sender, args) =>
            {
               Console.WriteLine($"PostgreSQL Message:
   {args.Notice.MessageText}");
            };
            connection.Open( );
            var query = "SELECT contains_Bit('" +
   test_string + "', @auth_token) as result";
            using var command = new NpgsqlCommand(query,
   connection);
            var bitArrayParam = new
   NpgsqlParameter("@auth_token",
   NpgsqlTypes.NpgsqlDbType.Text)
            {
               Value = auth_token // Example bit array
            };
            command.Parameters.Add(bitArrayParam);
            var result = string.Empty;
            try
            {
               var reader = command.ExecuteReader( );
               while (reader.Read( ))
               {
                  result = reader ["result"].ToString( );
                  break;
               }
            }
            catch (Exception ex)
            {
               Console.WriteLine($"Error: {ex.Message}");
            }
            finally
            {
               connection.Close( );
            }
            return result;
         }
      }
   }
```

The following C#code is an example implementation of method 400.

```
using Authorizer;
using System;
using System.Collections;
using System.Security.Cryptography;
using System.Security.Cryptography.X509Certificates;
using System.Text;
class JoshiBitMap
```

-continued

```
{
   public readonly int numHashFunctions;
   private string bitarray;
   // Initialization
   public JoshiBitMap(int capacity, double
falsePositiveRate)
   {
      // Calculate the optimal size of the bit array and
the number of hash functions
      int m = GetOptimalBitArraySize(capacity,
falsePositiveRate);
      Console.WriteLine(m);//96
      numHashFunctions = GetOptimalNumHashFunctions(m,
capacity);
      Console.WriteLine(numHashFunctions); //7
      // Initialize the bit array
      bitArray = new BitArray(m);
   }
   // Function: Add value to Bitmap
   public void Add(string input)
   {
      foreach (int hashValue in
GetHashValues(input.ToUpper( )))
      {
         bitArray[hashValue] = true;
      }
   }
   // Bitmap
   public readonly BitArray bitArray;
   // Function: C# implementation to Check if test value
is in the Bitmap
   public bool Contains(string input)
   {
      var collection =
GetHashValues(input.ToUpper( )).ToList<int>( );
      foreach (int hashValue in collection)
      {
         if (!bitArray[hashValue])
            return false;
      }
      return true;
   }
   // Function: C# implementation to create hash values
for given string value
   private IEnumerable<int> GetHashValues(string input)
   {
      using (SHA256 sha256 = SHA256.Create( ))
      {
         byte[ ] inputBytes =
Encoding.UTF8.GetBytes(input);
         byte[ ] hashBytes =
sha256.ComputeHash(inputBytes);
         for (int i = 0; i < numHashFunctions; i++)
         {
            if ((i * 4) + 4 > hashBytes.Length) break;
            int hashValue =
int.Parse(Convert.ToHexString(hashBytes.AsEnumerable<byte>(
).Skip(i * 4).Take(4).ToArray<byte>( )),
System.Globalization.NumberStyles.HexNumber)
               % bitArray.Length;
            yield return Math.Abs(hashValue);
         }
      }
   }
   // Internal Function: derive attribute for Bitmap
   private int GetOptimalBitArraySize(int capacity, double
falsePositiveRate)
   {
      return (int)Math.Ceiling(-capacity *
Math.Log(falsePositiveRate) / Math.Pow(Math.Log(2), 2));
   }
   // Internal Function: derive attribute for Bitmap
   private int GetOptimalNumHashFunctions(int
bitArraySize, int capacity)
   {
      return (int)Math.Ceiling((bitArraySize /
(double)capacity) * Math.Log(2));
   }
   // Function: C# implementation for converting Bitmap to
```

-continued

```
a format that is easy to transport over network - Base64
  public string ConvertBitArrayToBase64(BitArray
bitArray)
  {
    // Create a byte array to hold the bits from the
BitArray
    byte[ ] byteArray = new byte[(bitArray.Length + 7) /
8];
    bitArray.CopyTo(byteArray, 0);
    // Convert the byte array to a Base64-encoded
string
    return Convert.ToBase64String(byteArray);
  }
}
class Program
{
  // PRIMARY Function: this is where execution starts
  static void Main( )
  {
    // Example
    // Initializing Bitmap, seting up size, setting
tolerance of Max false Positive rate.
    var bitFilter = new JoshiBitMap(capacity: 25,
falsePositiveRate: 0.001);
    // Adding few data values to Bitmap, User is
authorized to see any record that hold any of these values.
    bitFilter.Add("2TGC");
    bitFilter.Add("T2XA");
    bitFilter.Add("efgh");
    bitFilter.Add("0R1R");
    bitFilter.Add("CCAA");
    bitFilter.Add("CCCA");
    bitFilter.Add("1TGC");
    bitFilter.Add("22XA");
    bitFilter.Add("3fgh");
    bitFilter.Add("4R1R");
    bitFilter.Add("5CAA");
    bitFilter.Add("6CCA");
    bitFilter.Add("7TGC");
    bitFilter.Add("82XA");
    bitFilter.Add("9fgh");
    bitFilter.Add("011R");
    bitFilter.Add("C2AA");
    bitFilter.Add("C3CA");
    bitFilter.Add("24GC");
    bitFilter.Add("T5XA");
    bitFilter.Add("e6gh");
    bitFilter.Add("071R");
    bitFilter.Add("C8AA");
    bitFilter.Add("C9CA");
    //Create Authorization Token: NUM_Hash Functions +
SEPERATOR KEYWORD + BITMAP
    string auth_token =
bitFilter.numHashFunctions.ToString( ) + "Bh@gy3sh" +
bitFilter.ConvertBitArrayToBase64(bitFilter.bitArray);
    // OPIONAL STEP -- sign Authorization Token
    string signature = Sign(auth_token);
    Console.WriteLine(auth_token);
    Console.WriteLine(auth_token.Length);
    // Test data value
    string testString = "2tgc";
    // Verify Authorization with Database functions, at
record level
    var response = PGSql.Execute(auth_token,
testString);
    Console.WriteLine($"String '{testString}' exists:
{bitFilter.Contains(testString)} == {response}");
    // OPIONAL STEP -- Verify signature on
Authorizatino Token
    if (ValidateSignature(auth_token, signature))
    {
      Console.WriteLine("Signature validated !!");
    }
    {
      Console.WriteLine("Signature validation
failed.");
    }
  }
  // Function: C# implementation to sign Authorization
```

-continued

```
token with a certificate
  private static string Sign(string data)
  {
    string certPath =
@"C:\Path\To\YourCertificate.pfx";
    string certPassword = "YourCertificatePassword";
    X509Certificate2 certificate = new
X509Certificate2(certPath, certPassword,
X509KeyStorageFlags.Exportable);
    byte[ ] dataBytes = Encoding.UTF8.GetBytes(data);
    using (RSACryptoServiceProvider rsa =
(RSACryptoServiceProvider)certificate.GetRSAPublicKey( ))
    {
      byte[ ] signatureBytes = rsa.SignData(dataBytes,
HashAlgorithmName.SHA256, RSASignaturePadding.Pkcs1);
      string base64Signature =
Convert.ToBase64String(signatureBytes);
      Console.WriteLine($"Signature:
{base64Signature}");
      return base64Signature;
    }
    return null;
  }
```

The following C# code is an example implementation of 530.

```
  // Function: C# implementation to verify signature of
Authorization token with a certificate
  private static bool ValidateSignature(string data,
string signature)
  {
    bool isSignatureValid;
    string certPath =
@"C:\Path\To\YourCertificate.pfx";
    string certPassword = "YourCertificatePassword";
    X509Certificate2 certificate = new
X509Certificate2(certPath, certPassword,
X509KeyStorageFlags.Exportable);
    using (RSACryptoServiceProvider rsa =
(RSACryptoServiceProvider)certificate.GetRSAPublicKey( ))
    {
      isSignatureValid =
rsa.VerifyData(Encoding.UTF8.GetBytes(data),
Encoding.UTF8.GetBytes(signature),
HashAlgorithmName.SHA256, RSASignaturePadding.Pkcs1);
    }
    Console.WriteLine($"Signature is valid:
{isSignatureValid}");
    return isSignatureValid;
  }
}
```

Although a few variations have been described in detail above, other modifications or additions are possible. For example, the authorization token can be signed and verified with a certificate to determine whether the token was tampered in-flight. As another example, the process flow depicted in the accompanying figures and described herein do not require the particular order shown, or sequential order, to achieve desirable results. Other embodiments may be within the scope of the following claims.

The subject matter described herein provides many technical advantages. For example, some implementations of the current subject matter can provide an approach to determining access to database records by validating an authorization token using a data attribute and providing access to the database records when permission has been granted. By validating an authorization token using a data attribute, some implementations of the current subject matter can provide improved data authorization speed, capacity, and efficiency. For example, this improvement can provide a technical solution that allows for data authorization to data records with limited computational overhead and resource-heavy queries. As another example, in some implementations, the authorization token is designed to encapsulate access rights in a single, easily transferable package that can be quickly validated across multiple domains and systems. This portability can be useful in multi-domain networks or distributed systems where the different domains can have their own data, access rights, services, and policies. Further, by including the relevant access information in the authorization token, this can enable validation at the point-of-access without requiring time and resource-intensive programming calls. This improvement can improve performance and reduce latency, which can be useful in real-time applications or systems with large data sets.

Additionally, some implementations of the current subject matter can securely validate the authorization token and provide access to data records. This can be useful in environments where data sensitivity and confidentiality are critical, such as financial record management, medical data, or other types of confidential information. Further, because the token can securely encapsulate the access information, it can be securely validated without necessitating continuous reference to the original authorization source or other authorization checks. This can reduce potential attack vectors from unauthorized or malicious sources.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving data characterizing a request to access a database record, a data attribute of the database record, and an authorization token;

determining, based on the received data, permission to access the database record by at least validating the authorization token using the data attribute; and providing access to the database record in response to determining permission to access the database record;

wherein the authorization token is generated by:

determining a size of a bit array corresponding to the database record based on contextual information associated with the database record;

determining a number of iterations for a hash function based on the size of the bit array and the contextual information associated with the database record;

generating the bit array based on the size of the bit array, number of iterations for the hash function, and the contextual information associated with the database record;

generating a hash value by applying a cryptographic function based on the size of the bit array and the number of iterations;

plotting the hash value in the bit array based on the cryptographic function; and encoding the bit array into a format capable of transmission.

2. The method of claim 1, wherein the data attribute indicates an owner of the database record and at least one identifier indicating a user identity has permission to access the database record.

3. The method of claim 1, wherein generation of the authorization token further comprises adding a timestamp to the authorization token.

4. The method of claim 1, wherein generation of the authorization token further comprises signing the authorization token with a certificate.

5. The method of claim 1, wherein validating the authorization token further comprises:

splitting the authorization token into a first value including an encoded bit array and a second value indicative of a hash function;

decoding the encoded bit array into a decoded bitmap;

generating a hash value from authorization information associated with the data attribute;

converting the hash value into an array of integers based on at least the second value;

comparing the array of integers and the decoded bitmap; and determining permission to access the database record in response to the array of integers matching the decoded bitmap.

6. The method of claim 5, wherein validating the authorization token further comprises verifying a signature provided with the authorization token with a public certificate.

7. The method of claim 1, wherein the data characterizing a request to access a database record, a data attribute of the database record, and an authorization token is received by an application programming interface.

8. The method of claim 1, wherein providing access to the database record further comprises:

transmitting a query request for data to the database record; and returning the requested data from the database record when the query request is received by the database record.

9. A system comprising:

at least one data processor; and memory storing instructions configured to cause the at least one data processor to perform operations comprising:

receiving data characterizing a request to access a database record, a data attribute of the database record, and an authorization token;

determining, based on the received data, permission to access the database record by at least validating the authorization token using the data attribute; and providing access to the database record in response to determining permission to access the database record;

wherein the authorization token is generated by:

determining a size of a bit array corresponding to the database record based on contextual information associated with the database record;

determining a number of iterations for a hash function based on the size of the bit array and the contextual information associated with the database record;

generating the bit array based on the size of the bit array, number of iterations for the hash function, and the contextual information associated with the database record;

generating a hash value by applying a cryptographic function based on the size of the bit array and the number of iterations;

plotting the hash value in the bit array based on the cryptographic function; and encoding the bit array into a format capable of transmission.

10. The system of claim 9, wherein the data attribute indicates an owner of the database record and at least one identifier indicating a user identity has permission to access the database record.

11. The system of claim 9, wherein generation of the authorization token further comprises adding a timestamp to the authorization token.

12. The system of claim 9, wherein generation of the authorization token further comprises signing the authorization token with a certificate.

13. The system of claim 9, wherein validating the authorization token further comprises:

splitting the authorization token into a first value including an encoded bit array and a second value indicative of a hash function;

decoding the encoded bit array into a decoded bitmap;

generating a hash value from authorization information associated with the data attribute;

converting the hash value into an array of integers based on at least the second value;

comparing the array of integers and the decoded bitmap; and determining permission to access the database record in response to the array of integers matching the decoded bitmap.

14. The system of claim 13, wherein validating the authorization token further comprises verifying a signature provided with the authorization token with a public certificate.

15. The system of claim 9, wherein the data characterizing a request to access a database record, a data attribute of the database record, and an authorization token is received by an application programming interface.

16. The system of claim 9, wherein providing access to the database record further comprises:

transmitting a query request for data to the database record; and returning the requested data from the database record when the query request is received by the database record.

17. A non-transitory computer program product storing instructions which, when executed by at least one data processor forming part of at least one computing system, cause the at least one data processor to implement operations comprising:

receiving data characterizing a request to access a database record, a data attribute of the database record, and an authorization token;

determining, based on the received data, permission to access the database record by at least validating the authorization token using the data attribute; and providing access to the database record in response to determining permission to access the database record;

wherein the authorization token is generated by:

determining a size of a bit array corresponding to the database record based on contextual information associated with the database record;

determining a number of iterations for a hash function based on the size of the bit array and the contextual information associated with the database record;

generating the bit array based on the size of the bit array, number of iterations for the hash function, and the contextual information associated with the database record;

generating a hash value by applying a cryptographic function based on the size of the bit array and the number of iterations;

plotting the hash value in the bit array based on the cryptographic function; and encoding the bit array into a format capable of transmission.

* * * * *